Feb. 11, 1958 J. KLINK 2,822,624
WIRE HOLDER FOR THREE-WIRE METHOD OF MEASURING THREADS
Filed July 18, 1955 2 Sheets-Sheet 1
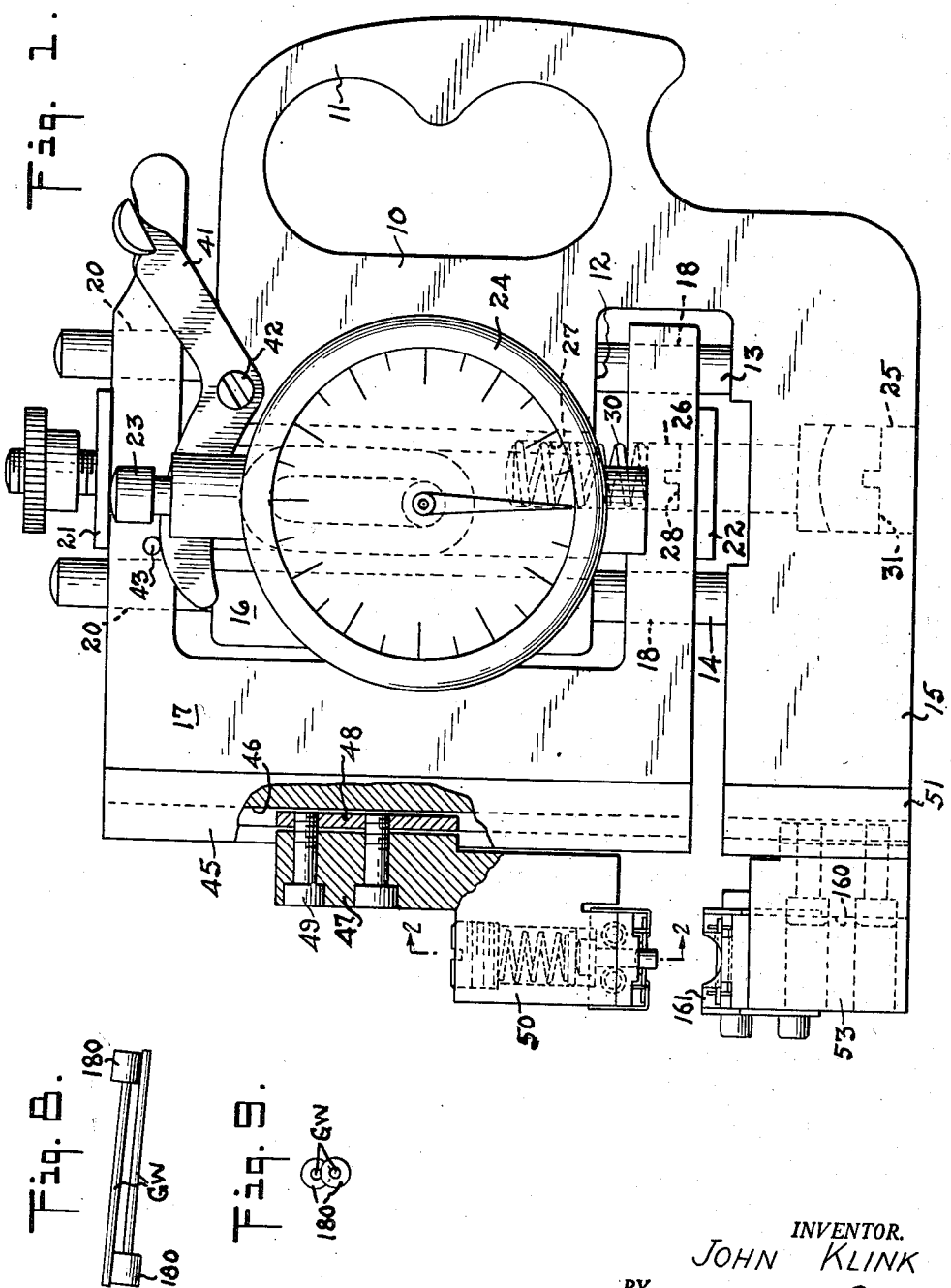
INVENTOR.
JOHN KLINK
BY
Darby & Darby
ATTORNEYS Feb. 11, 1958   J. KLINK   2,822,624
WIRE HOLDER FOR THREE-WIRE METHOD OF MEASURING THREADS
Filed July 18, 1955   2 Sheets-Sheet 2
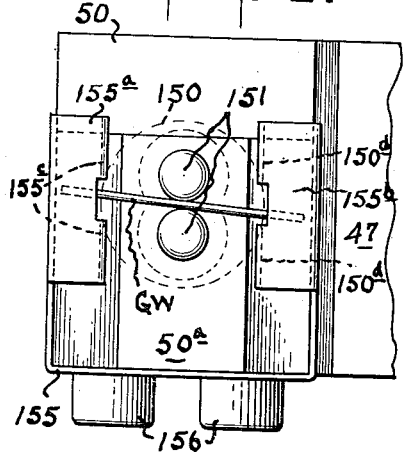
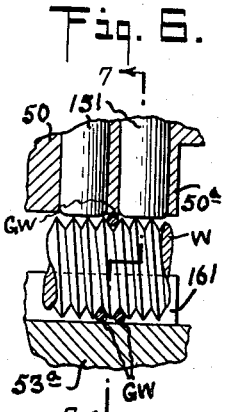
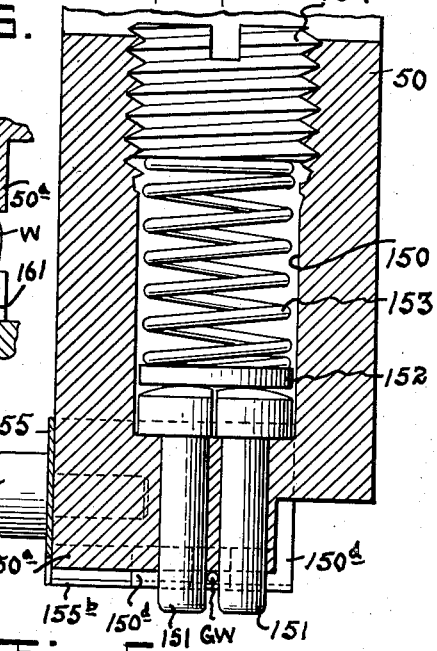
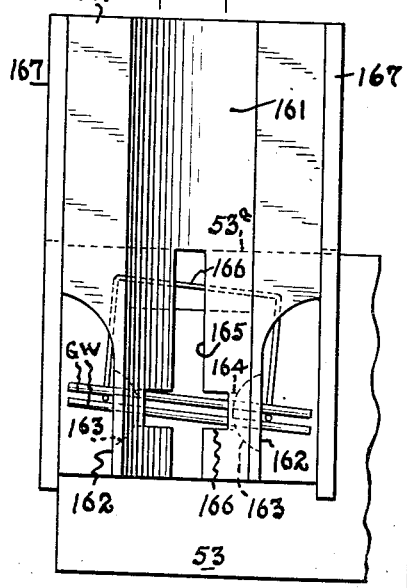
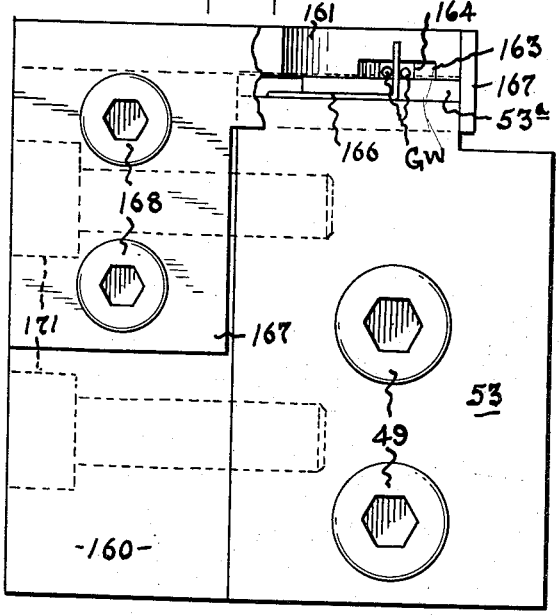
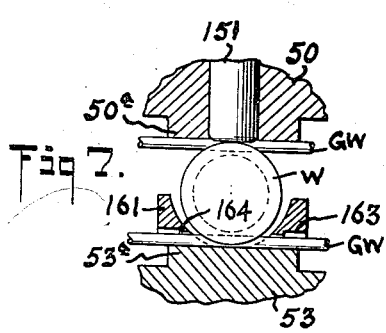
INVENTOR.
JOHN KLINK
BY
Darby & Darby
ATTORNEYS

United States Patent Office 2,822,624
Patented Feb. 11, 1958

2,822,624

WIRE HOLDER FOR THREE-WIRE METHOD OF MEASURING THREADS

John Klink, Pine Plains, N. Y., assignor to Standard Gage Company, Inc., Poughkeepsie, N. Y., a corporation of New York Application July 18, 1955, Serial No. 522,418

15 Claims. (Cl. 33—199)

This invention relates to a thread gaging device particularly for gages finer than sixteen threads per inch and taps of the two or four flute type down to No. 80 using the three-wire method.

A prime object of this invention is to provide a gaging instrument adapted to hold the gaging wires used in the three-wire gaging method in clamping fixtures thereby eliminating the well recognized difficulty of handling these wires in accordance with the usual procedure.

A more specific object of the invention is to provide in a gaging instrument a pair of cooperating fixtures for holding the gaging wires with a limited range of movement so that they will be guided by the threads being gaged into correct gaging position.

An important object of this invention is to provide a hand gage of this type having relatively fixed and movable clamping members carrying the gaging wires and provided with spring means for urging clamping members in a direction to cause the gaging wires to contact a threaded member and properly seat with respect to the threads thereof to effect accurate gaging.

Other and more detailed objects of the invention will be apparent from the disclosure of the embodiment illustrated in the attached drawings.

In the drawings:

Figure 1 is a side elevational view of an external thread gage embodying the subject matter of this invention;

Figure 2 is a detail, cross-sectional view taken on the line 2—2 of Figure 1;

Figure 3 is a bottom view of the upper clamping jaw;

Figure 4 is a top plan view of the lower clamping jaw;

Figure 5 is a front view of the lower clamping jaw with one of the wire confining plates removed;

Figure 6 is a vertical, central, cross-sectional view showing the gage in clamping relation;

Figure 7 is a cross-sectional view taken on the line 7—7 of Figure 6;

Figures 8 and 9 are plan and end views of a modified form of wire spacing structure.

For illustrative purposes the subject matter of this invention is shown incorporated in a dial gage, but it will be apparent to those skilled in the art that the subject matter may be incorporated in other practical gaging structures. For the sake of completeness the subject matter of the invention has been shown with one suitable form of gaging assembly which is of the type disclosed quite completely in the copending applications of Erik H. Aldeborgh and Frank H. Czaplinski, Serial No. 421,492, filed April 7, 1954, now Patent No. 2,784,494 issued March 12, 1957, and Serial No. 446,306, filed July 28, 1954.

The form of the invention illustrated in the drawings includes a supporting fixture having a relatively stationary block like member 10 which is equipped with the handhold 11 and is adapted to be manually manipulated when the gaging operation is performed. Obviously the frame- work could be of the bench type and instead of being finger operated, as will be explained later, it could be pedal operated. The member 10 is generally rectangular in shape and provided with a slot 12. Two guide rods 13 and 14 are supported in the lower extension 15, as well as in the upper extension 16, which extensions result from the presence of the slot 12. The guide rods 13 and 14 extend across the gap formed by the slot 12, and as clearly shown extend above the upper edge of the member 10. They are accurately positioned so that they are parallel to one another. Slidably mounted on the guide rods 13 and 14 is a relatively movable gaging frame 17 which is generally U-shaped and provided with the bores 18 and 20 for sliding movement on the rods 13 and 14.

Mounted on the upper arm of the frame 17 is an anvil 21 which extends laterally of the frame member and at right angles thereto. A similar anvil 22 is mounted on the bottom face of the lower arm of the U-shaped member 17, but is of no importance to this invention. Anvil 21 is adapted to cooperate with the operating plunger 23 of the dial indicator 24 which is mounted on the upper extension 16 of member 10.

A threaded bore 15 is provided in the lower arm 15 of the member 10. Aligned with the bore 25 is a similar threaded bore 26 in the lower arm of the U-shaped member 17 and aligned with this bore is a third but unthreaded bore 27 in the extension 16 of the member 10. A spring 30 lies in the bore 27 and rests on the screw 28 therein. The bore 25 is closed with screw 31. Pivotally mounted on the member 10 by means of a screw 42 is a bell crank lever 41 provided with a finger piece at the end adjacent the hand opening 11. The other end of this lever has a camming edge which engages a pin or cam follower 43 secured on the upper extension of the member 17. When the lever 41 is depressed by pressure on the finger piece the opposite end of the lever engaging the pin 43 will raise the U-shaped member 17 against the action of spring 30. Member 17 carries with it the anvil 21 which engages the operating plunger 23 for the gage 24.

The face edge of the member 17 is provided with a bar 45 which is detachably secured thereto by machine screws, not shown. In a similar way an extension of that bar is shown at 51 secured to the corresponding face edge of the arm 15 of the block member 10. Each of the bars 45 and 51 is provided with a longitudinal T-shaped slot open at its outer face. Secured to these bars are a pair of clamping jaws which support the gaging wires. These clamping jaws 47 and 53 are secured to the bars 45 and 51 respectively, as exemplified by the metal block 48, shown in the T-shaped slot 46. For example, in the case of the clamping jaw 47, it is connected to the metal block 48 by means of machine screws 49. The lower clamping jaw 53 is connected to the bar 51 in a similar way. This construction permits of relative adjustment of the clamping jaws 47 and 53 on their respective supports and of locking them in adjusted positions.

The clamping jaw 47 is provided with a lateral extension 50 which may be integral or detachably secured thereto which is milled on the side to form a projection 50ª of limited area which provides the upper anvil for the upper gaging wire GW. The extension 50 is provided with a bore 150 which is closed at its upper end by means of a threaded plug 154. It lower end communicates with a pair of circular passages extending through the anvil 50ª and in these passages lie a pair of headed pins 151 having adjacent faces of the heads milled away, as is clear in Figures 2 and 3. Resting on these heads is a disc 152 forming an abutment for the lower end of the compression spring 153 which is engaged at its upper end by the plug 154.

Extending around three sides of the extension 50, see Figure 3, is a U-shaped saddle member 155, which has a pair of right angle extensions 155a and 155b which extend parallel to the end face of the anvil extension 50a. Each of these extensions in turn has a pair of right angled extensions 150c and 150d, the length of which serves to determine the spacing of the extensions 155a and 155b from the plane of the face of the anvil 50a. The extension pairs 155c and 150d are spaced to provide gaps, see Figures 2 and 3, which limit the angular swing of the ends of the upper gaging wire which lies between the pins 151. Thus the saddle 155 is constructed to hold the upper gaging wire within the desired limits of freedom of movement necessary to insure that that wire will seat when a threaded workpiece W, see Figures 6 and 7, is being gaged. The saddle 155 is secured to the opposite side of the extension 50 by means of machine screws 156.

The lower clamping member 53 is milled at its upper end to form an anvil extension 53a of limited area, see particularly Figure 4. The lower gaging wires GW in this case a pair of them, rest on the end face of the anvil and are held with the desired spacing by means of the upturned ends of a U-shaped wire member 166 which extends around the anvil extension 53a.

The gaging wires of the pair are confined within the desired range of limited movement to perform the desired functions by means of the following structure. Secured to one face of the lower clamping member 53 is an L-shaped block 160 which is secured to the clamping member by means of machine screws 171. The arm 161 of the member 160 overlies and extends parallel to the end face of the extension 53a, see Figure 5. The arm 161 is milled longitudinally to form a semicircular groove, see Figures 1 and 7, in which the threaded work piece W is placed for gaging purposes. The milling cut is deep enough so as to extend completely through the arm 161 to provide a slot represented by the long part of the cross shaped opening 165, see Figure 4. The under surface of the arm 161 towards its free end has a transverse slot 164 milled in it which cuts through the upper semicircular wall to form the shorter arm 169 of the cross shaped opening. The under surface of the arm 161 in the same region is also milled at its side edges on the arcuate lines 163. The result of the formation of the transverse groove 164 and the milled areas 163 is clearly shown in elevation for one side of the arm 161 in Figure 5.

This construction provides a passage of predetermined limited size within which the lower gaging wires GW are free to have predetermined limited angular movement. This function combined with the spacing function of the wire member 166 insures that the lower gaging wires GW will have a movement within a limited range so that they will properly seat in the threads of the workpiece W, see Figure 6.

A pair of L-shaped side plates 167 are secured to the side faces of the L-shaped member 160 by means of machine screws 168 to limit the axial movement of the wires of the lower gaging pair GW, see Figure 4.

The use of this device will be apparent to those skilled in the art. Lever 41 is depressed to raise the U-shaped member 17 and with it the upper clamping member 47. This compresses spring 30. The threaded work piece W is placed in the semicircular saddle 161 onto the lower gaging wire pair GW which will find their place in adjacent pair of grooves as indicated in Figure 6. As the pressure on the lever 41 is released, spring 30 will move the member 17 downwardly and with it the upper clamping member. The spring loaded pins 151 will first engage the crests of the threads and as the upper clamping member 50 moves downwardly under the action of spring 30, the pin pair 151 will recede into the clamping member 50 against the resistance of spring 153. Naturally these springs will be proportioned to permit this action. This action continues until the pins 151 have fully receded within the clamping member 50 and freed the upper gage wire GW so that it may seat in the proper thread groove, see Figure 6. When the lever 41 is fully released the device will be in gaging position, at which time the gaging wires will rest on faces of the anvil 50a and extension 53a and the gage 24 will give an indication of thread size or its comparative accuracy, depending upon the calibration of the gage.

It will also be seen that when the lever 41 is again depressed to raise the upper clamping member 50 as it recedes from the workpiece W, pins 151 will remain stationary under the pressure of spring 153 against the workpiece until the heads of the pins 151 are again seated by the closed end of the bore 150. At this time the upper gaging wire GW will again be fully controlled by the pins 151 and the associated extensions on the saddle 155.

As an alternative structure for holding the lower pair of gaging wires GW in the proper spaced relation each wire may have secured on the end thereof a small cylindrical sleeve 180, see Figure 8. These sleeves perform the same function as the upturned ends of the wire member 166, and of course, will replace it.

From the above description it will be apparent to those skilled in the art that the various parts of this structure will be made of suitable materials to withstand usage and wear of the order required in devices of this type. The gaging wires GW are, of course, made of special hardened steels, and with special care to be properly dimensioned and the anvil 50a and extension 53a will naturally be treated so as to be perfectly flat and parallel and of a properly hardened material. Likewise, the pins 151 must also be of sufficiently hardened material so that the wear incident to normal use will not be beyond tolerances for devices of this kind.

For emphasis it is noted again that the pins 151 provide a sort of pivotal support for the wire which moves out of the way during the gaging action and the peculiar formation of the arm 161 is such in conjunction with the wire member 166 as to permit relative freedom of movement of the lower gaging wire pair GW within confining limits such that the user will have no difficulty in assuring that the wires will all be within a positionable range so as to properly seat as the parts move into gaging position.

Those skilled in the art will understand, of course, how the gage 24 operates with the remainder of the structure to give the desired indication.

From the above description it will be apparent that there is provided herein a novel structure for facilitating the handling of gaging wires used in the three-wire method for finer thread sizes. These wires are very small and difficult to handle by normal methods so that the structure herein provided represents a distinct advance to facilitate ease in handling these wires for this purpose.

Those skilled in the art will appreciate that the subject matter of this invention is capable of variation in detail without departure from its novel substance, and it is preferred, therefore, that the disclosure be taken in an illustrative sense.

What is claimed is:

1. In a gaging instrument of the type described, a pair of relatively movable anvil members, a pair of gaging wires on the surface of one of said anvils, a single gaging wire on the surface of the other of said anvils, means releasably engaging said single wire intermediate its ends to facilitate pivotal movement thereof, means for limiting said pivotal movement, means for retaining said pair of gaging wires on its anvil, and means for holding the wires of said pair in spaced relation.

2. In the combination of claim 1, said engaging means comprising a pair of retractible pins between which said single wire lies.

3. In the combination of claim 1, said limiting means comprising a saddle attached to the associated anvil member having a pair of spaced lugs adjacent each end of said wire between which the adjacent wire end can move.

4. In the combination of claim 1, said engaging means comprising a pair of retractible pins between which said single wire lies, said limiting means comprising a saddle attached to the associated anvil member having a pair of spaced lugs adjacent each end of said wire between which the adjacent wire end can move.

5. In the combination of claim 1, said retaining means comprising an arm overlying the anvil for the pair of gaging wires having means formed therein to provide spaced pairs of abutments adjacent the respective ends of the wires.

6. In the combination of claim 1, said holding means comprising a U-shaped member having the ends of its arms lying between said wires.

7. In the combination of claim 1, said holding means comprising separators mounted on said wires.

8. In the combination of claim 1, said holding means comprising sleeves secured to the opposite ends of said wire pair.

9. In the combination of claim 1, said retaining means comprising an arm overlying the anvil for said gaging wire pair having pairs of abutments adjacent each end of said wire pair and said holding means comprising spacer members engaging between said wires.

10. In the combination of claim 1, said retaining means comprising a member secured to said anvil and lying parallel to its face having abutments formed thereon in pairs positioned adjacent the respective ends of the wires of said pair, and the upper face of said member forming a seat for a workpiece, said member having an aperture therethrough to expose said wire pair for engagement with the workpiece when in said seat.

11. In the combination of claim 1, means for limiting the longitudinal movement of said single wire.

12. In the combination of claim 1, means for limiting the longitudinal movement of said wire pair.

13. In the combination of claim 1, said limiting means comprising a saddle having portions positioned adjacent the ends of said single wire to limit its axial movement.

14. In the combination of claim 1, said engaging means comprising a pair of pins slidably mounted in the associated anvil and means for resiliently loading said pins.

15. In the combination of claim 1, said retaining means comprising a member overlying the end of the anvil for said wire pair having a longitudinal recess on its outer face and a transverse recess on its inner face to provide a workpiece seat and confining abutments for the ends of the wires of said wire pair, said recesses intersecting to expose said wires intermediate their ends.

References Cited in the file of this patent

UNITED STATES PATENTS

| | | |
|---|---|---|
| 2,431,021 | Bourdelais | Nov. 18, 1947 |
| 2,692,438 | Schneider | Oct. 26, 1954 |

FOREIGN PATENTS

| | | |
|---|---|---|
| 583,385 | Great Britain | Dec. 17, 1946 |